(12) United States Patent
Wilkins et al.

(10) Patent No.: US 12,499,349 B2
(45) Date of Patent: Dec. 16, 2025

(54) VALIDATION OF AUTOENCODERS THAT PERFORM TIMESTAMP COMPRESSION FOR PRINTING SYSTEM DATA

(71) Applicants: Ian Wilkins, Boulder, CO (US); Farnaz HajiahmadiFoomani, Boulder, CO (US)

(72) Inventors: Ian Wilkins, Boulder, CO (US); Farnaz HajiahmadiFoomani, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 17/944,447

(22) Filed: Sep. 14, 2022

(65) Prior Publication Data
US 2024/0086711 A1    Mar. 14, 2024

(51) Int. Cl.
*G06N 3/0455*   (2023.01)
*G06N 3/088*    (2023.01)
*H03M 7/30*     (2006.01)

(52) U.S. Cl.
CPC ........... *G06N 3/0455* (2023.01); *G06N 3/088* (2013.01); *H03M 7/3059* (2013.01)

(58) Field of Classification Search
CPC ........ G06N 3/088; G06N 3/045; G06N 3/084; G06N 3/0455; H03M 7/3059
See application file for complete search history.

(56) References Cited

U.S. PATENT DOCUMENTS

| | | |
|---|---|---|
| 10,880,181 B2 | 12/2020 | Kvernvik et al. |
| 2018/0314937 A1 | 11/2018 | Zarar et al. |
| 2020/0097810 A1 | 3/2020 | Hetherington et al. |
| 2020/0311548 A1* | 10/2020 | Shrivastava ........... G06N 3/082 |
| 2021/0281491 A1 | 9/2021 | Raghuprasad et al. |
| 2022/0230098 A1* | 7/2022 | Zakharov ............... G06N 20/20 |

FOREIGN PATENT DOCUMENTS

| | | |
|---|---|---|
| KR | 102055915 B1 | 12/2019 |
| KR | 20210115991 A | 9/2021 |

OTHER PUBLICATIONS

F-test; Wikipedia; Aug. 22, 2022.
Ghiarot et al; Time series compression:a survey; Jan. 21, 2021.
Simpson et al; A machine learning approach to Model Order Reduction of Nonlinear Systems via Autoencoder and LSTM Networks; Sep. 23, 2021.

* cited by examiner

*Primary Examiner* — Andrew L Tank
(74) *Attorney, Agent, or Firm* — Duft & Bornsen, PC (57) ABSTRACT

Systems and methods are provided for validating an autoencoder for a printing system. In one embodiment, a system stores values associated with individual features at a printing system and further stores times indicating when the values were determined at the printing system. The system also operates an autoencoder to perform time-compression upon the values and the times. Validating the autoencoder includes: determining predictive powers of the individual features prior to time-compression via partial F tests, determining predictive powers of the individual features after time-compression via partial F tests, and determining differences between the predictive powers of the individual features before time-compression and the predictive powers of the individual features after time-compression. Depending upon differences in the predictive powers, a report is generated indicating validity or invalidity of the autoencoder.

20 Claims, 9 Drawing Sheets

VALIDATION OF AUTOENCODERS THAT PERFORM TIMESTAMP COMPRESSION FOR PRINTING SYSTEM DATA

TECHNICAL FIELD

The following disclosure relates to the field of printing, and in particular, to machine learning models for printing systems.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

It remains desirable to maintain a production printer to ensure that components do not unexpectedly fail. Regular preventive maintenance may reduce the need for time-consuming repair projects. For example, preventively adjusting tension at a roller for a production printer may prevent the web from breaking during printing, which means that the web will not need to be re-threaded through the printing system. However, production printers are also expected to be utilized for long durations in order to ensure that production targets are met. Thus, needless preventive maintenance increases labor costs at the print shop while also reducing production (i.e., by taking the production printer offline).

Techniques have been implemented for the purpose of predicting the performance of a production printer, such as the time that a fan at the printer will fail. However, it remains difficult to determine the types of information at the printing system that are most relevant to the prediction process for each condition being predicted. Further complicating this issue, the amount (and format) of data reported by a production printer varies greatly, making it difficult to analyze.

Thus, print shop operators continue to desire new systems and methods for anticipating the performance of a production printer.

SUMMARY

Embodiments described herein provide enhanced techniques for validating an autoencoder that time-compresses data describing the historical performance of a printer. For example, data tables describing characteristics of a printer at asynchronous times may be used as input for an autoencoder. Using this input, the autoencoder may create a time-compressed data table having simulated values at synchronous points in time. This process enables data for the printer to be rapidly formatted in a manner that facilitates training and evaluation of a machine learning model for the printer.

Furthermore, embodiments described herein perform partial F test evaluation of time-compressed data tables, in order to determine whether features in the time compressed data tables have the same predictive power that they had before compression. This helps to ensure that the compression process does not unduly alter the predictive performance of a machine learning model being trained for the printer.

One embodiment is a system for validating an autoencoder for a printing system. The system includes a memory storing values associated with individual features at a printing system and further storing times indicating when the values were determined at the printing system. The system also includes a controller that operates an autoencoder to perform time-compression upon the values and the times. The controller is further able to validate the autoencoder by: determining predictive powers of the individual features prior to time-compression via partial F tests, determining predictive powers of the individual features after time-compression via partial F tests, and determining differences between the predictive powers of the individual features before time-compression and the predictive powers of the individual features after time-compression. The controller generates a report for a user indicating invalidity of the autoencoder upon determining that the differences in the predictive powers are not within a threshold, and generates a report for the user indicating validity of the autoencoder upon determining that the differences in the predictive powers are within the threshold.

A further embodiment is a non-transitory computer readable medium embodying programmed instructions which, when executed by a processor, are operable for performing a method. The method includes storing values associated with individual features at a printing system and times indicating when the values were determined at the printing system, and operating an autoencoder to perform time-compression upon the values and the times. The method further includes validating the autoencoder, by: determining predictive powers of the individual features prior to time-compression via partial F tests; determining predictive powers of the individual features after time-compression via partial F tests; and determining differences between the predictive powers of the individual features before time-compression and the predictive powers of the individual features after time-compression. The method additionally includes generating a report for a user indicating invalidity of the autoencoder in an event that the differences in the predictive powers are not within a threshold; and generating a report for the user indicating validity of the autoencoder in an event that the differences in the predictive powers are within the threshold.

A further embodiment is a method for validating an autoencoder for a printing system. The method includes storing values associated with individual features at a printing system and times indicating when the values were determined at the printing system, and operating an autoencoder to perform time-compression upon the values and the times. The method further includes validating the autoencoder, by: determining predictive powers of the individual features prior to time-compression via partial F tests; determining predictive powers of the individual features after time-compression via partial F tests; and determining differences between the predictive powers of the individual features before time-compression and the predictive powers of the individual features after time-compression. The method additionally includes generating a report for a user indicating invalidity of the autoencoder in an event that the differences in the predictive powers are not within a threshold; and generating a report for the user indicating validity of the autoencoder in an event that the differences in the predictive powers are within the threshold.

Other illustrative embodiments (e.g., methods and computer-readable media relating to the foregoing embodiments) may be described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
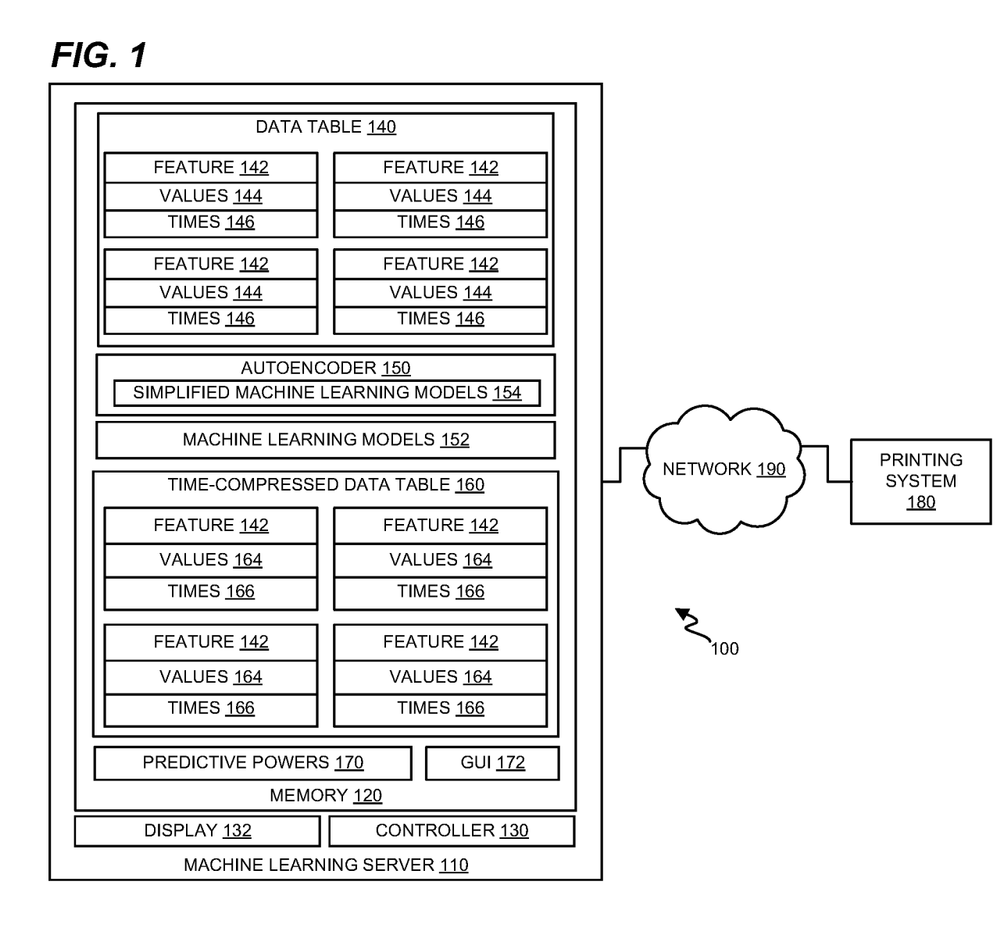
FIG. 1 is a block diagram of a machine learning environment an illustrative embodiment.

FIG. 1 is a block diagram of a machine learning environment 100 in an illustrative embodiment. In this embodiment, the machine learning environment 100 includes a machine learning server 110 and a printing system 180. Machine learning server 110 reviews data (e.g., measurements, reported values, etc.) from the printing system 180, and uses an autoencoder 150 to convert features in the data into a suitable format for training one or more machine learning models.

As used herein, a feature comprises any type of data that pertains to the printing system 180. For example, a feature may comprise a voltage measurement for a component of the printing system 180, a printer status condition (e.g., "on"), a measured speed, an error status, an amount of ink usage, tension at a web of paper, or any other suitable metric, and may be paired with a corresponding time value. In an operating environment, values for features may be stored in tens or hundreds of data tables 140. Each data table 140 may provide asynchronous reporting of a distinct set of features for the printing system 180, formatted as time-series data. During operation of the printing system 180, the data tables 140 may be generated by a print controller, marking engine, Digital Front End (DFE), or the like at the printing system 180. However, the sheer numerosity of features being tracked, together with the asynchronous nature in which values are determined for such features, results in a data set that is generally unsuitable for training machine learning models. In this embodiment, information collected at the printing system 180 is transmitted via a network 190 to machine learning server 110. Network 190 may comprise, for example, the Internet, a private network comprising computing devices coupled via wireless or wired interfaces, etc.

Machine learning server 110 has been enhanced to utilize an autoencoder 150 to time-compress one or more of the data tables 140 into a suitable format for a machine learning model 152. Machine learning server 110 has been further enhanced to validate output from the autoencoder 150, in order to ensure that the process of converting the data has not altered the ability of features in the data to predict a performance of the printing system 180. For example, the machine learning server 110 may validate a time-compressed data table that reports values for features such as fan speed for a printer, print medium temperature, fan temperature, print medium speed, print medium alignment, and ink consumption. Machine learning server 110 may perform this action by determining whether a predictive power of each feature remains the same both before and after compression.

In this embodiment, data from the printing system 180 is formatted into one or more data tables 140 in memory 120. Each data table 140 reports one or more features 142 (e.g., feature labels) recorded by the printing system 180 or a device monitoring the printing system 180. For each feature 142, a series of values 144 (e.g., feature values) are provided, as well as times 146 (e.g., feature times) at which the values 144 were determined. Pairs of values 144 and corresponding times 146 may be stored as tuples in the data table 140 for each of the features 142.

A notable breadth of features 142 may be recorded in a data table 140, and each of the features 142 may be recorded at different points in time. For example, values 144 for certain features 142 may be recorded periodically (e.g., by the second, by the minute, by the day, etc.), while other features 142 may be recorded in response to events (e.g., system shut-down, an error condition, an amount of ink usage, etc.). Furthermore, some features 142 may be recorded periodically, but only during certain events for the printing system 180, such as printing. Such features may comprise paper speed, paper temperature, tension of a web of paper, etc. This means that it is difficult, if not impossible, to find values 144 for a set of features 142 at the same points in time.

Autoencoder 150 is configured perform time-compression upon the values 144 and times 146 for each feature 142. In this embodiment, the autoencoder 150 analyzes the data table 140 to create a time-compressed data table 160. Time-compressed data table 160 includes data for each of the features 142 from the data table 140. However, time-compressed data table 160 has been populated with values 164 and times 166 which have been estimated (e.g., simulated, inferred, or otherwise suggested) based on the values 144 and times 146 in the data table 140. Specifically, the values 164 and times 166 have been uniformly time-compressed, such that each feature 142 includes values 164 at the same times 166. This makes data for each feature 142 in the time-compressed data table 160 suitable for training one or more machine learning models 152.

Autoencoder 150 may be implemented by controller 130 operating program code, such as the TensorFlow code library, to perform time compression. In one embodiment, the autoencoder 150 actively generates and evaluates one or more simplified machine learning models 154 when performing time compression, in order to determine an efficacy of the time-compression process. These simplified machine learning models 154 may comprise multiple linear regression (MLR) models, multiple polynomial regression (MPR) models, or others which are capable of being rapidly operated and trained. Thus, relative to machine learning model 152, the simplified machine learning models 154 may be trained and operated with a notably lower processing burden.

Output from the autoencoder 150 is evaluated by controller 130 for the purpose of determining whether the predictive power 170 for each feature 142 before time-compression has been preserved after time-compression. As used herein, a predictive power 170 refers to an amount that presence or absence of data for a feature 142 impacts the accuracy of predictions made by a machine learning model.

Controller 130 performs its evaluation process via the use of partial F tests, which are described in greater detail below. If the autoencoder 150 is validated by the controller 130, then the autoencoder 150 may be utilized across a range of historic data (e.g., a variety of historic data tables) to generate a larger set of training data for machine learning model 152.

Machine learning model 152 may comprise a more complex or detailed model than simplified machine learning models 154. Thus, while simplified machine learning models 154 may be architected for efficient operation, machine learning model 152 may be architected for accuracy in prediction. For example, machine learning model 152 may comprise a neural network, such as a Deep Neural Network (DNN), having tens or hundreds of layers, with tens, hundreds, or thousands of nodes in each layer.

Controller 130 may be implemented as custom circuitry, as a hardware processor executing programmed instructions, etc. For example, the controller 130, and/or any controllers discussed herein, may include one or more Central Processing Units (CPUs), Graphics Processing Units (GPUs), microprocessors, Digital Signal Processors (DSPs), Application-specific Integrated Circuits (ASICs), Programmable Logic Devices (PLDs), control circuitry, etc. Some examples of processors include INTEL® CORE™ processors, Advanced Reduced Instruction Set Computing (RISC) Machines (ARM®) processors, etc.

Memory 120, storing data table 140, autoencoder 150, machine learning models 152, and time-compressed data table 160, may comprise any suitable optical or digital storage medium, such as Random Access Memory (RAM), a hard disk, flash drive, etc. For example, the memory 120 may include any electronic circuits, optical circuits, and/or magnetic circuits that are able to store data, including one or more volatile or non-volatile Dynamic Random Access Memory (DRAM) devices, FLASH devices, volatile or nonvolatile Static RAM (SRAM) devices, magnetic disk drives, Solid State Disks (SSDs), etc. Some examples of non-volatile DRAM and SRAM include battery-backed DRAM and battery-backed SRAM.

FIG. 1 further depicts instructions for a Graphical User Interface (GUI) 172, which presents graphical features via a display 132 (e.g., a monitor, screen, etc.) for review by a user. For example, GUI 172 may be updated at display 132 in order present information describing autoencoder 150, data table 140, time-compressed data table 160, machine learning models 152, and/or parameters pertaining thereto.

The particular arrangement, number, and configuration of components described herein is illustrative and non-limiting. Illustrative details of the operation of machine learning environment 100 will be discussed with regard to FIG. 2. Assume, for this embodiment, that printing system 180 internally determines values 144 for features 142 over time, and generates one or more data tables 140 indicating the values 144 of the features 142 over time. These data tables 140 are then provided to machine learning server 110 for evaluation, analysis, and use in training a machine learning model 152.

Figure 2:
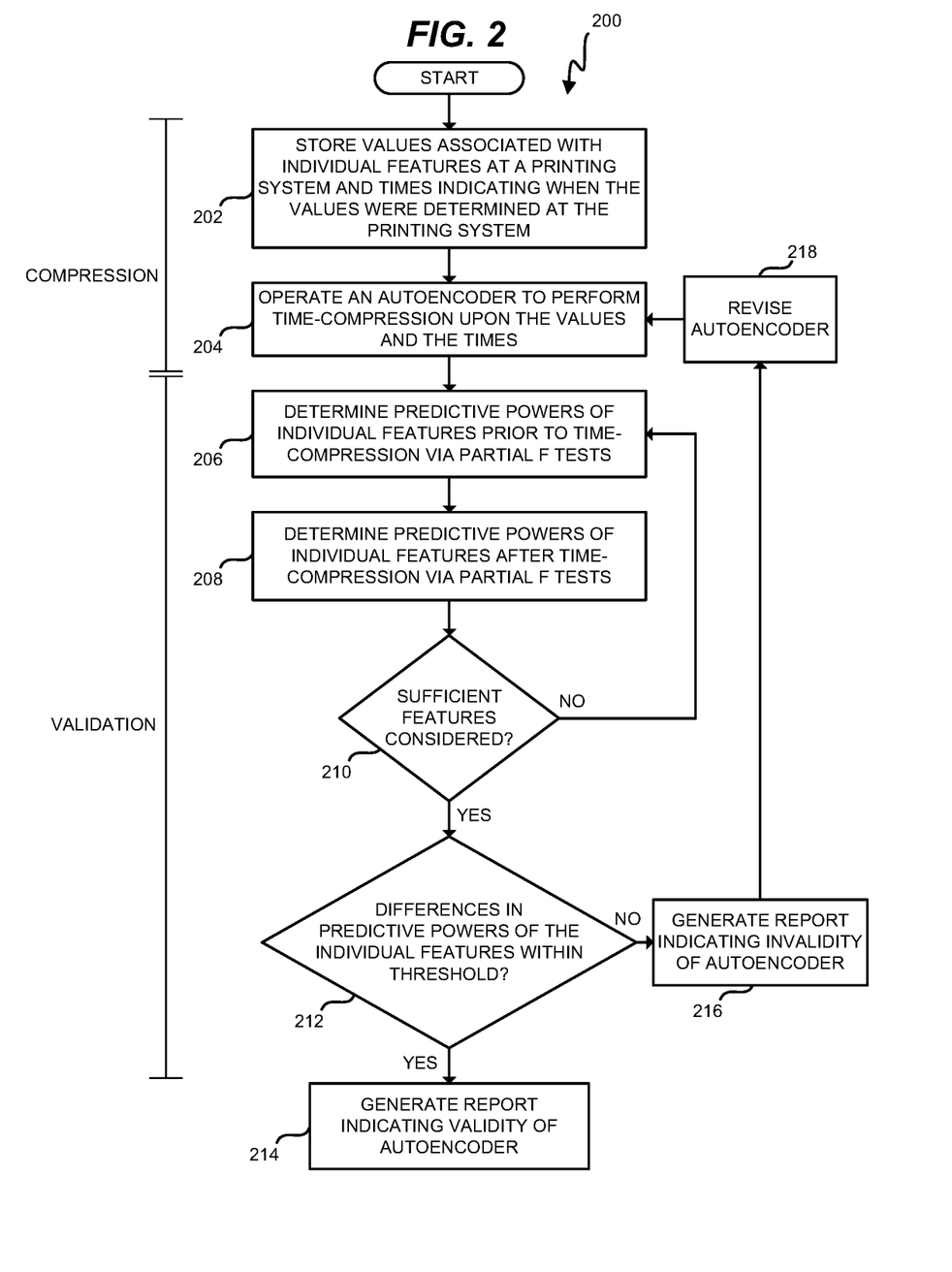
FIG. 2 is a flowchart illustrating a method for validating an autoencoder for a machine learning environment in an illustrative embodiment.

FIG. 2 is a flowchart illustrating a method 200 for validating an autoencoder for a machine learning environment in an illustrative embodiment. The steps of method 200 are described with reference to machine learning server 110 of FIG. 1, but those skilled in the art will appreciate that method 200 may be performed in other systems. The steps of the flowcharts described herein are not all inclusive and may include other steps not shown. The steps described herein may also be performed in an alternative order.

Steps 202-204 comprise a compression phase, wherein data for features 142 is time-compressed and reformatted. In step 202, controller 130 receives and/or stores values 144 associated with individual features 142 at the printing system 180, and further stores times 146 indicating when corresponding values 144 were determined at the printing system 180. As used herein, an "individual" feature is one of the many features 142.

In step 204, controller 130 operates the autoencoder 150 to perform time-compression upon the values 144 and the times 146 for each of the individual features 142. Autoencoders are designed for use as feature extraction tools that select a subset of features that have a greatest influence on the efficacy of a machine learning model. In step 204, autoencoder 150 is instead utilized as a time extraction tool. That is, autoencoder 150 intelligently reduces the number of times for which values are provided in a data table, while also inferring values for the reduced number of times. Time extraction (i.e., time compression) results in a technical benefit, by reducing overall dimensionality, while still preserving the number of features being considered during machine learning.

In one embodiment, the autoencoder 150 performs time-compression by reducing the number of timestamps and/or estimating values associated with the features at a set of predetermined times, based on the values stored in the memory. For example, the autoencoder 150 may convert 2D data tables into 2D arrays having dimensions of timestamp and feature value. Before processing by the autoencoder 150, "NaN" or other indefinite values may be replaced with a mean value for the corresponding feature on the same day, or may be removed entirely. During training, an individual autoencoder may be trained for each data table 140, and a resulting size of encoded features may be chosen as an absolute size, a size compression factor (e.g., a compression factor of eight), a percent reduction in overall times reported, etc. In this manner, the autoencoder 150 reduces the number of times and values, from an arbitrary and varying number across each of the features, to a uniform set. The uniform set may comprise, for example, a tuple of time and value, per second, per feature. The autoencoder is evaluated according to a suitable metric, such as Mean Square Error (MSE), and loss may be determined via MSE as well.

In one embodiment, the autoencoder 150 may be implemented as a variational autoencoder neural network, in order to reduce a number of times while still capturing relationships between features. A variational autoencoder approximates a compression function of the input timeseries, and attempts to retain the predictive behaviors (e.g., predictive powers) found in the input, but not all of the timesteps. Thus, when evaluating the autoencoder during operation, the autoencoder is evaluated based on successful compression of the input into the desired number of timesteps. The reduction in number of times and values provides a technical benefit, by reducing the computational cost and training time for machine learning models. As used herein, predictive behaviors comprise quantitative measurements such as predictive power, as well as qualitative measurements relating to predictions.

Steps 206-214 constitute a validation phase for the autoencoder 150, wherein data that has been time-compressed by the autoencoder 150 is validated to ensure that predictive powers for individual features 142 have been preserved.

Step 206 comprises determining predictive powers of the individual features prior to time-compression via partial F tests. In one embodiment, the controller 130 performs a partial F test as follows. The controller 130 determines prediction accuracy for a simplified machine learning model 154 that has been trained with a group of individual features. This may comprise operating the simplified machine learning model 154 on a testing set of data (not shown), and determining a percentage accuracy of the simplified machine learning model 154 in making predictions.

The controller 130 further determines prediction accuracy for the simplified machine learning model 154 after training the simplified machine learning model 154 with a reduced group. The reduced group consists of the group used to initially train the model, after a selected individual feature has been removed. The change in prediction accuracy of the simplified machine learning model 154, after the selected feature has been removed, is herein referred to as a "predictive power" of the selected feature. In this embodiment, the individual features comprise between five and five hundred features, such as between ten and one hundred different features. Furthermore, in this embodiment, each group comprises between two and ten features, such as between three and five different features.

In a further embodiment, partial F tests are iteratively performed with random sampling of features for groups and random sampling of selected features. In this manner, the controller 130 determines predictive power of the individual features by iteratively performing partial F tests upon different, randomly selected, groups of the individual features.

A threshold number of randomly sampled partial F tests (e.g., one thousand, or ten thousand) may be performed in order to adequately sample the predictive power of the various features being considered. For example, the random sampling may be Monte Carlo sampling, if desired.

In further embodiments, the techniques described above may be utilized to determine predictive powers for entire sets of features at once. For example, if a full feature set has n features, a reduced feature set can have between one and n minus one features. Removing/evaluating more than one feature at a time can have benefits by reducing the number of tests needed to evaluate the solution space. That is, since the predictive power of more features is considered in each test, fewer overall tests may be needed. In one embodiment, if a full dataset has n features, and a reduced dataset has n-m features, then m may be selected as an integer from between one and ten percent of n.

Step 208 comprises determining predictive powers of the individual features after time-compression via partial F tests. This may be performed in a similar manner to step 206. However, instead of random sampling, the same groups and selected features are used as chosen in step 206. This allows the predictive power of individual features, within different groups, to be compared both before and after compression.

Step 210 comprises determining whether sufficient features have been considered during steps 206-208. If all features have not yet been considered individually, or a limit for randomly chosen sampling has not yet been reached, then processing returns to step 206, wherein a next batch of features may be chosen for consideration (e.g., via Monte Carlo sampling or other techniques).

Selecting a number of features for consideration, or a number of randomly chosen tests to perform, provides a technical benefit by avoiding the processing delay and expense associated with exhaustively evaluating every possible permutation of features for potential change in predictive power. In one embodiment, an aggregate f-statistic is determined for all the features evaluated, then the number of features is increased by one, evaluated and aggregated (e.g., as a mean or median) to determine the aggregate f-statistic again. If the difference in the aggregated f-statistic is less than a threshold (e.g., one percent), then there is no need for additional sampling/testing. However, many embodiments will use a specific number of tests, instead of comparing aggregated f-statistic values.

In further embodiments, the number of features to consider is determined before evaluating the predictive behaviors of the compressed data, and the number of predictive behaviors to evaluate in the compressed data will match that of the uncompressed data. Thus, step 210 may be considered at a different point in time (i.e., as a step prior to method 200), or may be foregone entirely in certain embodiments.

In step 212, controller 130 determines differences between the predictive powers of the individual features before time-compression and the predictive powers of the individual features after time-compression. Each of these differences may comprise an absolute difference (or percentage difference) between predictive powers for a feature before and after compression. Each of the differences is compared to a threshold. The threshold may comprise a percentage of allowable deviation from a predictive power of a corresponding feature prior to time compression, an absolute value chosen for the feature, etc. For example, the threshold may comprise five percent of the predictive power prior to compression, ten percent, etc.

In further embodiments, each partial F test produces multiple sets of F test statistics ("f-values") and p-values for corresponding data, and the sets are compared to determine the differences. An f-value comprises the F statistic as defined for F tests. Meanwhile, a p-value comprises a probability of the f-value being correct. In this manner, if an f-value changes for a selected feature before and after time-compression, then the autoencoder 150 may be reported as invalid.

In one embodiment, the f-value for a given predictive power is binary. If a simplified machine learning model 154 trained on the reduced group is less predictive than when trained on a complete group (or is significantly different in predictive ability) then the autoencoder 150 may be reported as invalid.

In a further embodiment, although the f-value may be reported as a binary value, it may be parameterized by an p-value (i.e., a numerical confidence level). If a predictive behavior is different before and after time-compression, it is possible to quantify the p-value that prediction results would be different. So long as a direction of the relation between an alpha value and p-value is preserved, the autoencoder may be considered valid. A validity determination may be made based on thresholds that consider any combination of f-values and p-values according to statistical practices.

In the event (i.e., upon determining) that the differences in the predictive powers 170 for each individual feature (e.g., as indicated by each partial F-test) are within the threshold, the autoencoder 150 has successfully preserved the relationships between the features being compressed. Thus, in step 214, controller 130 generates a report indicating validity of the autoencoder 150. The report may be presented via display 132 or transmitted to other computing devices via the network 190.

Alternatively, in the event (i.e., upon determining) that any of the differences in the predictive powers 170 are not within the threshold, the autoencoder 150 has altered the relationships between the features being compressed. This means that the compressed data is not suitable for training, because it is not an accurate representation of the original uncompressed data. Thus, in step 216, controller 130 generates a report indicating invalidity of the autoencoder 150, and processing proceeds to step 218, where a technician or operator revises the autoencoder 150, and returns to step 204 with the revised autoencoder. The report may be presented via display 132, or transmitted to other computing devices via the network 190. In one embodiment, controller 130 further utilizes the autoencoder 150 to train the machine learning model 152, after the differences in the predictive powers are determined to be within the threshold. That is, once the autoencoder 150 has been validated, it may immediately begin use of the autoencoder 150 in training more complex, nuanced models for predicting conditions at the printing system 180 and/or for operating a trained machine learning model.

Method 200 provides a technical benefit over prior techniques, because it allows for output from an autoencoder to be rapidly validated, without requiring that the predictive power of each and every possible combination of features be measured and considered.

Figure 3:
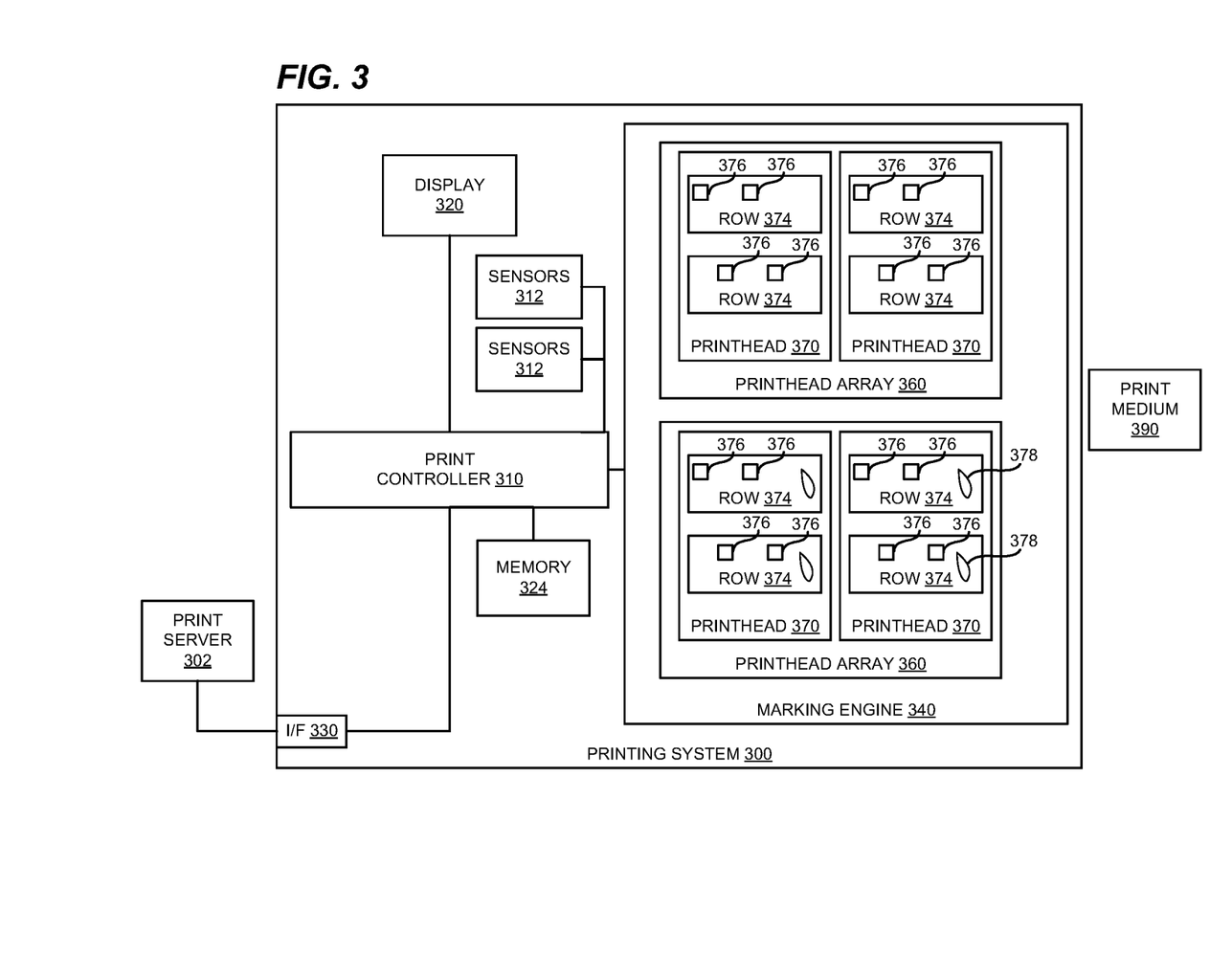
FIG. 3 is a block diagram illustrating components of a printing system in an illustrative embodiment.

FIG. 3 is a block diagram illustrating components of a printing system 300 in an illustrative embodiment. Printing system 300 may comprise, for example, a printing system 180, or other type of printing system as a matter of design choice. A machine learning model may be trained for predicting behaviors of the printing system 300 in accordance with the techniques described in FIG. 2. In this embodiment, the printing system 300 includes an interface (I/F) 330 for receiving print data and communicating with a print server 302, a print controller 310 for processing the print data, a marking engine 340 for marking the print medium 390 in accordance with the print data, sensors 312 for monitoring features at the printing system 300 over time, and a display 320 for presenting a Graphical User Interface (GUI) to process user instructions and provide summaries of print progress.

During operation of the printing system 300, I/F 330 receives print data for one or more print jobs (e.g., from a print server 302), and passes the print data to print controller 310. I/F 330 may receive the print data in the form of rasterized print data or Page Description Language (PDL) print data for storage in memory 324. I/F 330 may be implemented as an Ethernet interface, a wireless network interface, etc.

The print controller 310 processes the print data to prepare print jobs for printing, such as by rasterizing the print data and/or preparing halftone data based on the print data. For example, the print controller 310 may obtain/convert print data in formats such as an Intelligent Printer Data Stream (IPDS), PostScript, or Printer Command Language (PCL) into bitmaps for printing to a print medium with printhead(s) 370. The print controller 310 may utilize one or more Rasterization Image Processors (RIPs) to translate the print data into halftone bitmaps. A halftone bitmap is a two-dimensional array of pixels representing a pattern of ink drops to be applied to the print medium to form an image (or page) of a print job.

The marking engine 340 marks the print medium, such as a page, with ink to generate physical output for received print jobs. In this embodiment, the marking engine 340 comprises multiple printhead arrays 360. For example, the marking engine 340 may include a printhead array 360 for each of multiple color planes. Each printhead array 360 comprises multiple printheads 370. The printheads 370 may partially overlap along the widthwise direction, such as the X direction, to ensure that there are no visible widthwise gaps in applied ink. Each printhead 370 includes one or more rows 374 of nozzles 376, which eject droplets 378 of ink onto a print medium, such as a web or a page. Each nozzle 376 is configured to discharge/eject drops of ink onto the print medium in accordance with halftone data. Additionally, each nozzle 376 may eject a plurality of drop sizes (e.g., none, small, medium and large). The printheads 370 may be fixed such that each nozzle 376 consistently marks a specific, predefined location along the X direction (i.e., cross-process direction). Alternatively, the printheads 370 may be operable to move along the X direction. During printing, the print medium passes underneath the printhead arrays 360 while the nozzles 376 discharge ink to form pixels on the print medium 390.

Display 320 presents a GUI which provides reports indicating the status of ongoing printing operations. The display 320 may be implemented as a touchscreen, or a display screen configured for receiving input from a mouse, keyboard, microphone, etc.

Figure 4:
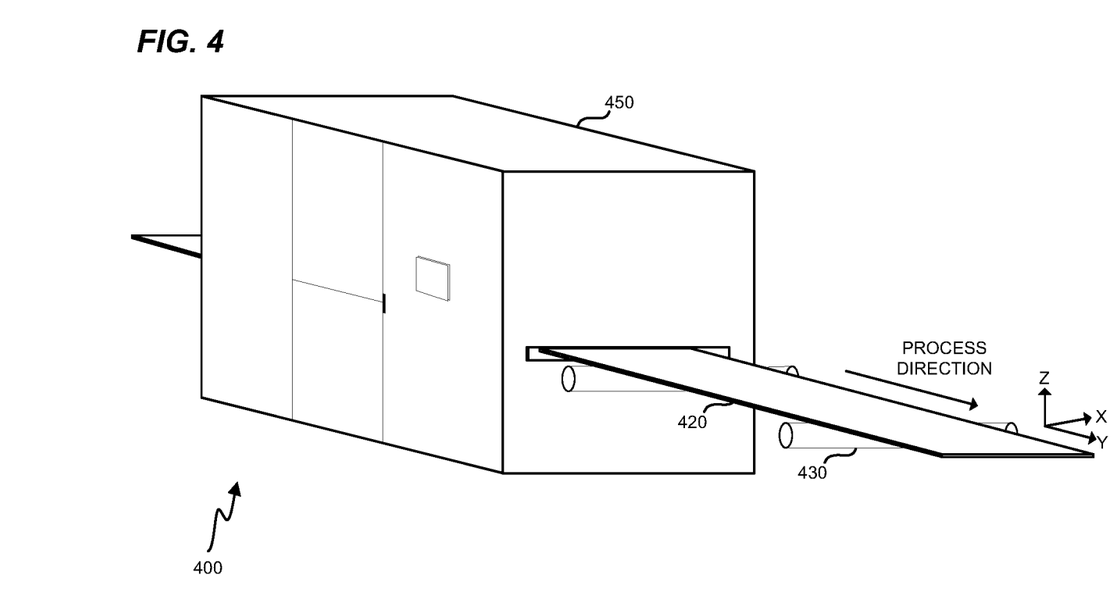
FIG. 4 is a diagram depicting a continuous-forms printing system in an illustrative embodiment.

FIG. 4 is a diagram depicting a continuous-forms printing system 400 in an illustrative embodiment, which may include an arrangement of components similar to that of printing system 300 of FIG. 3. In this embodiment, continuous-forms printing system 400 includes a printer 450 that marks a web 420 of a continuous print medium, such as paper. The web 420 is driven through the printer 450 and supported by rollers 430, which may comprise passive, freely rotating rollers or actively driven rollers.

Figure 5:
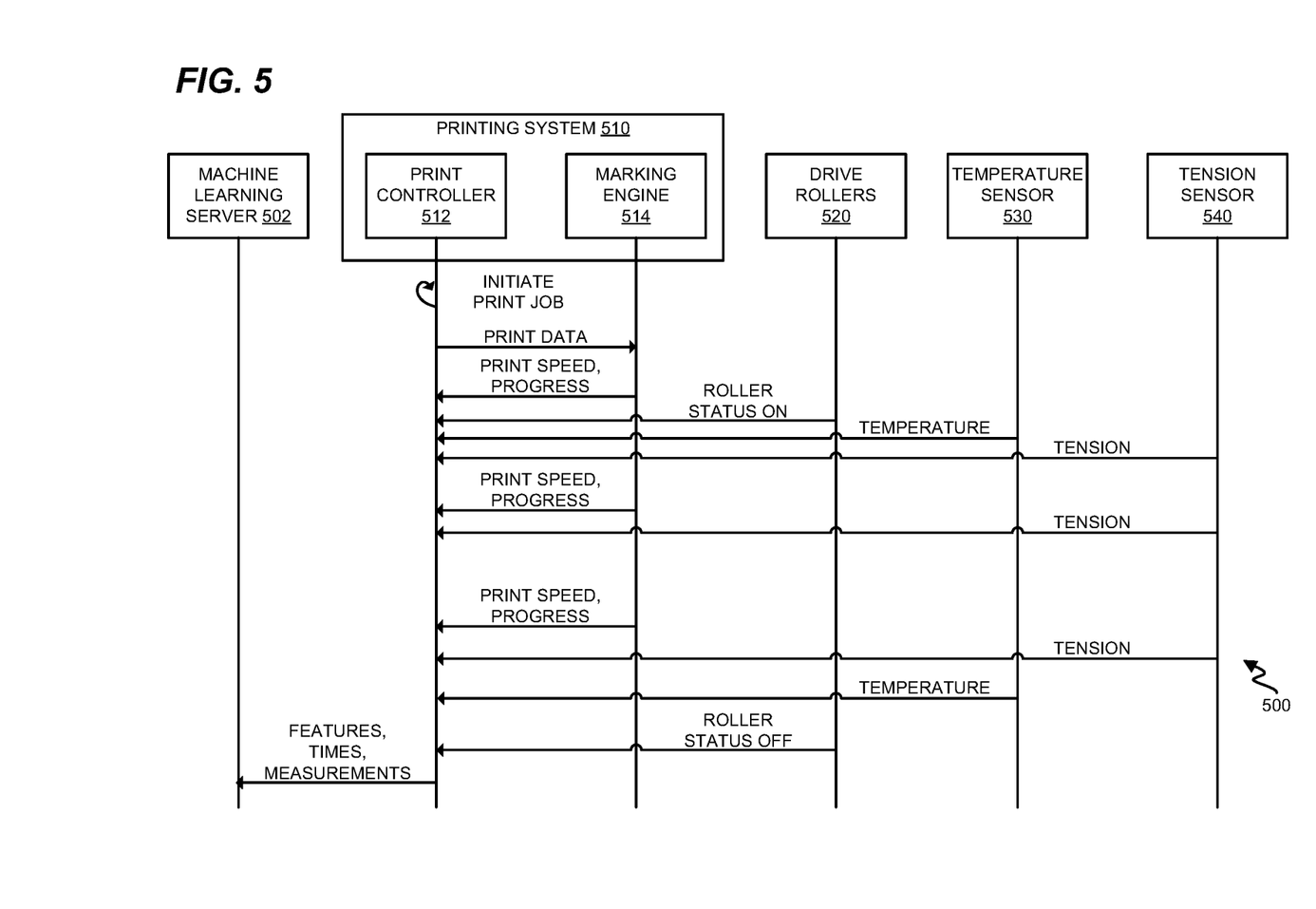
FIG. 5 is a message diagram depicting values reported by components of a printing system in an illustrative embodiment.

FIG. 5 is a message diagram 500 depicting values reported by components of a printing system 510 in an illustrative embodiment. For example, the values provided in message diagram 500 may represent measurements, readings, or other information provided by the continuous-forms printing system 400 of FIG. 4. In this embodiment, a print controller 512 of a printing system 510 initiates the printing of a print job. The print controller 512 sends print data to marking engine 514 in order to initiate printing. During printing, the marking engine 514 periodically (e.g., each second, each predefined amount of linear feet of print medium, or each predefined number of pages) reports progress as a printing speed, such as a number of pages per minute. The marking engine 514 also reports progress, such as a percentage of printing completed, a number of linear feet printed, or a number of pages printed.

During printing, drive rollers 520 are activated to move the print medium through the marking engine 514. The drive rollers 520 provide information, for example via one or more embedded sensors, indicating that they have turned on. Additionally, a temperature sensor 530 disposed at a dryer of the printing system 510, and a tension sensor 540 for measuring tension at the print medium, also provide measurements/values to print controller 512 for consideration. The duration, frequency, and type of information reported by each of these entities may vary widely. At a certain point in time, such as at the end of operations for the day, the print controller 512 stores received values in memory. Those values are then retrieved from the printing system 510 by machine learning server 502, for use in training a machine learning model.

Figure 6:
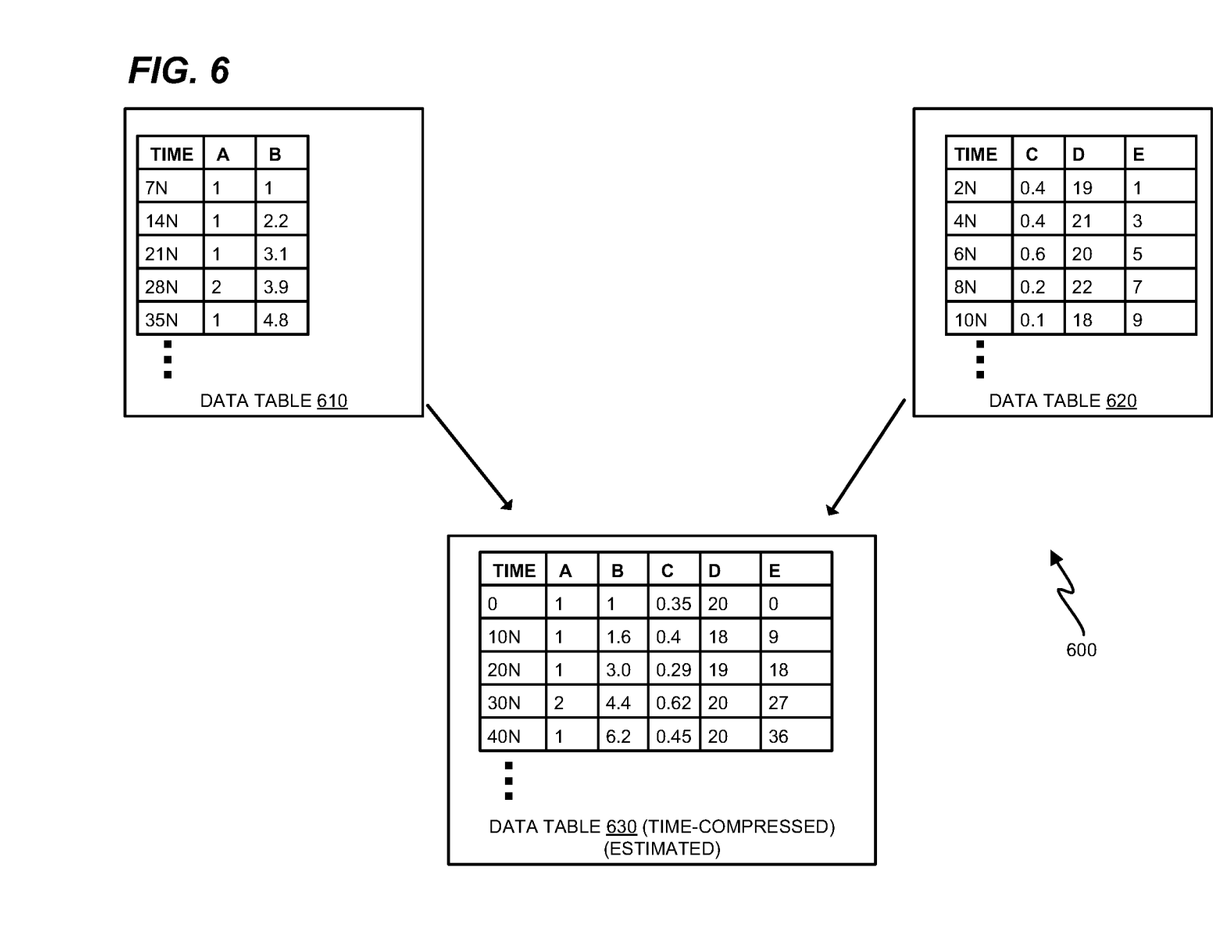
FIG. 6 is a diagram depicting generation of a data table that has been time-compressed in an illustrative embodiment.

FIG. 6 is a diagram 600 depicting generation of a data table 630 that has been time-compressed in an illustrative embodiment. The values chosen to receive time-compression in diagram 600 may be the same values that are reported in FIG. 5. As shown in FIG. 6, data table 610 reports values and times of acquisition for features A and B, while data table 620 reports values and times of acquisition for features C, D, and E. The time interval (in units (N) of time) for acquisition of the values varies notably between the two data tables. Operation of an autoencoder to perform time-compression of the data table 610 and the data table 620 results in data table 630. Data table 630 includes values for each of the features A, B, C, D, and E, and sets of these values are reported at the same instances in time, such that a first time includes values for all features, a second time includes values for all features, etc. These values have been estimated (e.g., simulated) by the autoencoder in order to be representative of the original data. Furthermore, the values have been time-compressed, such that data table 630 occupies less space in memory than data table 610 and data table 620. That is, there are fewer entries in data table 630 than data table 610 or data table 620. The amount of time compression results in a technical benefit that may have a notable impact on available memory. For example, time-compressing a data table to report each second, minute, hour, or day may save substantial space in memory for features that are measured each millisecond across the day.

Figure 7:
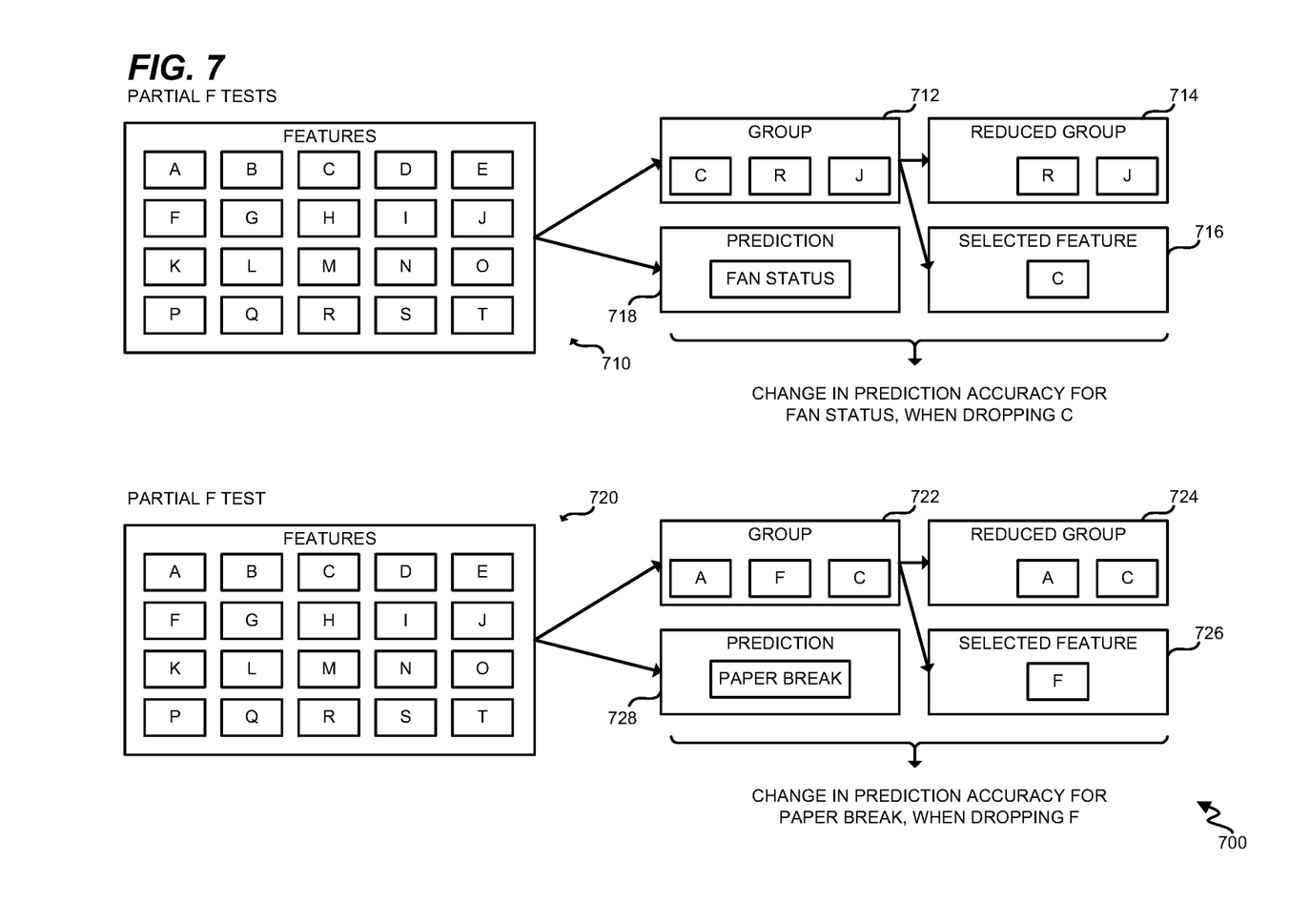
FIG. 7 is a diagram depicting the implementation of partial F tests to determine changes in predictive power in an illustrative embodiment.

FIG. 7 is a diagram 700 depicting the implementation of partial F tests to determine changes in predictive power in an illustrative embodiment. A first partial F test 710 is performed upon a set of features A-T. In this setting the total number of features is small, but in an operating environment, the total number of features may comprise one hundred, one thousand, or more individual features. A group 712 of features (e.g., three to five features) is randomly selected to make a prediction 718. In this instance, the prediction is for a status of a fan at a printing system, and a simplified machine learning model 154 is trained using the group 712 of features as input. Prediction accuracy for the simplified machine learning model 154 is then determined. This may be determined, for example, by identifying a numerical accuracy of predictions made by the simplified machine learning model 154 upon a test set of data.

Next, one feature is selected and dropped, resulting in a reduced group 714. The selected feature 716 is the individual feature that is being considered for its predictive power. The simplified machine learning model 154 is re-trained with the reduced group 714, and prediction accuracy for the simplified machine learning model 154 is measured again. The difference in the prediction accuracy is then determined and reported as an amount of prediction power granted by the selected feature 716. In this case, the partial F test indicates an amount of influence on prediction accuracy granted by feature C, when predicting fan status.

A second partial F test 720 is provided to predict a paper break condition at a printing system. A group 722 of features (e.g., three to five features) is randomly selected to make a prediction 728 for the paper break condition. Prediction accuracy for a simplified machine learning model 154 trained with the group 722 of features is then determined. Next, one feature is selected and dropped, resulting in a reduced group 724. The selected feature 726 is the individual feature that is being considered for its predictive power. The simplified machine learning model 154 is re-trained with the reduced group 724, and prediction accuracy for the simplified machine learning model 154 is measured again. The difference in the prediction accuracy is then determined as an amount of prediction power granted by the selected feature 726. In this case, the partial F test indicates an amount of influence on prediction accuracy granted by feature F, when predicting a paper break.

By iteratively performing hundreds or thousands of partial F tests with random sampling, a technical benefit is realized in that the predictive power for a representative sample of features may be determined without the processing burden associated with exhaustively investigating every single possible combination of features.

A partial F test may be utilized, for example, to determine an amount of predictive power that a feature has before time-compression, and an additional partial F test for the same features may be used to determine an amount of predictive power that the feature has after time-compression. By comparing the results of a partial F test after compression to the results of the partial F test prior to compression, it can be ascertained whether or not the predictive power of a feature has been unduly altered by the compression.

Figure 8:
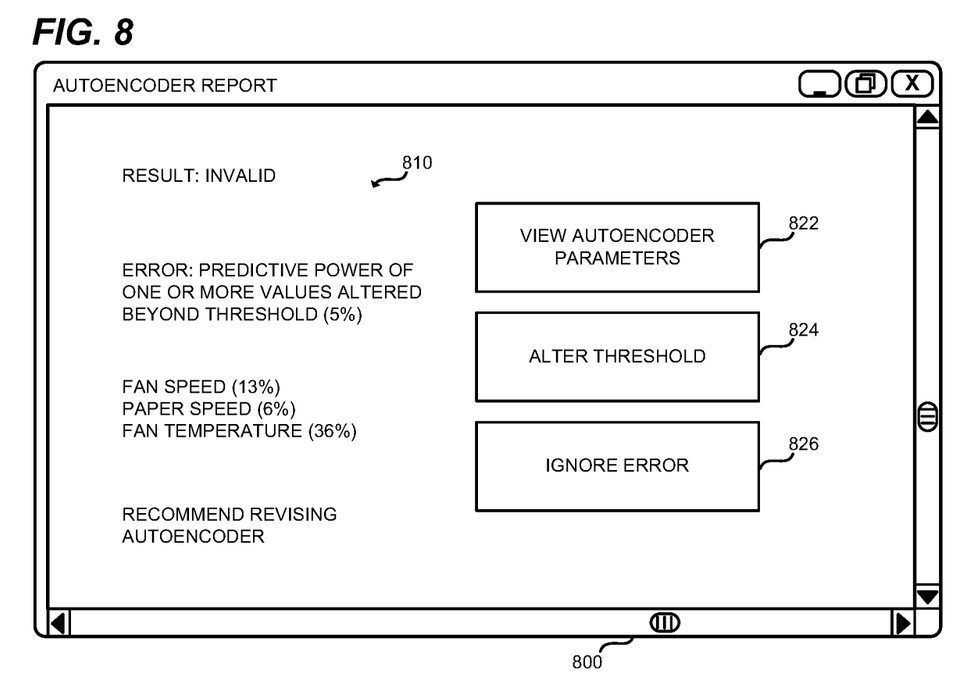
FIG. 8 is a diagram depicting a Graphical User Interface (GUI) that reports autoencoder validity in an illustrative embodiment.

FIG. 8 depicts a Graphical User Interface (GUI) 800 that reports autoencoder validity in an illustrative embodiment. As such, invalidity or validity results determined via the partial F tests of FIG. 7 may be presented via GUI 800. In this embodiment, GUI 800 provides a report 810 indicating whether or not an autoencoder is valid or invalid, indicating the type of invalidity encountered, and identifying (and quantifying) individual features that encountered changes in predictive power. The report 810 also provides a recommendation indicating a next step to be taken. In this embodiment, the GUI 800 further includes a series of buttons for addressing the invalidity determination. Specifically, button 822 provides for viewing and/or modifying the autoencoder, such as by modifying code or parameters for the autoencoder. Button 824 provides for altering the threshold amount of deviation in predictive power permitted before labeling an autoencoder as invalid, and button 826 permits ignoring the invalidity issue. This may result, for example, in preparation and utilization of time-compressed data prepared by the autoencoder as training data for the machine learning model 152.

EXAMPLES

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

In this example, a continuous-forms printing system includes a dryer that operates a fan to draw heated air across ink ejected onto a print medium in order to dry the ink. The printing system tracks temperature at the print medium, a speed at which the print medium is operated, an amount of watts of electricity consumed by the fan, and other features. The features are stored in data tables at the printing system, and then are retrieved by a machine learning server for the purposes of training. Specifically, the machine learning server attempts to train a machine learning model to predict an error status for the fan. To this end, the machine learning model processes the data tables with an autoencoder. The autoencoder reduces the data tables down from a per-millisecond (or per-second) measurement rate to a rate reported per minute, across an entire day. As a part of this process, the autoencoder estimates values for each of the minutes. The estimated values may comprise a mean of values for the minute under consideration, a mean of values taken before and after the minute under consideration, etc. The exact method by which the values are estimated is a function of parameters of the autoencoder, which may be modified as desired.

Simplified machine learning models are trained on uncompressed data and compressed data for randomly sampled groups of features. Partial F tests are then performed to determine the predictive power of selected features within the sampled groups, both for the uncompressed data and the compressed data. In this example, the predictive power of the feature of print medium speed changes by twenty percent after compression, which is greater than a ten percent threshold that has been predefined. Thus, the autoencoder is flagged as invalid. A GUI reporting the invalidity is then provided to the user, together with a list of features that changed in predictive power, as well as a percentage amount that the predictive power for those features has changed. A user consults the GUI, and revises code for the autoencoder before attempting to create new time-compressed data. The new time-compressed data does not exhibit any changes in predictive power beyond the threshold. Thus, the autoencoder is validated. The user operates the autoencoder to perform time-compression of a large swathe of data (e.g., data for thousands of printing systems for the same model, across multiple years of time). The time-compressed swathe of data is then used to train a complex DNN machine learning model for predicting fan status using the features.

The clauses provided hereinbelow grant further support for the inventive concepts recited throughout the specification:

A first clause is provided in the form of a system for validating an autoencoder for a printing system. The system includes a memory storing values associated with individual features at a printing system and further storing times indicating when the values were determined at the printing system. The system also includes a controller that operates an autoencoder to perform time-compression upon the values and the times. The controller is further able to validate the autoencoder by: determining predictive powers of the individual features prior to time-compression via partial F tests, determining predictive powers of the individual features after time-compression via partial F tests, and determining differences between the predictive powers of the individual features before time-compression and the predictive powers of the individual features after time-compression. The controller generates a report for a user indicating invalidity of the autoencoder upon determining that the differences in the predictive powers are not within a threshold, and generates a report for the user indicating validity of the autoencoder upon determining that the differences in the predictive powers are within the threshold.

A second clause is provided in the form of the first clause wherein the controller is further able to use the autoencoder to train a machine learning model, upon determining that the differences in the predictive powers are within the threshold.

A third clause is provided in the form of the first clause wherein each partial F test produces multiple sets of f-values and p-values, and the sets are compared to determine the differences in the predictive powers.

A fourth clause is provided in the form of the first clause wherein the controller is further able to perform a partial F test by determining prediction accuracy for a machine learning model after training with a group of individual features, determining prediction accuracy for the machine learning model after training with a reduced group wherein a selected feature has been removed, and identifying a difference between the prediction accuracies as a predictive power of the selected feature that has been removed.

A fifth clause is provided in the form of the first clause wherein the individual features comprise between ten and one hundred different features, and each group comprises between three and five different features.

A sixth clause is provided in the form of the first clause wherein the controller is further able to determine predictive power of the individual features by iteratively performing partial F tests upon different, randomly selected, groups of the individual features.

A seventh clause is provided in the form of the first clause wherein the autoencoder performs time-compression by estimating values associated with the features at a set of predetermined times, based on the values stored in the memory.

An eighth clause is provided in the form of the first clause wherein the features are selected from the group consisting of: fan speed for a printer, print medium temperature, fan temperature, print medium speed, print medium alignment, and ink consumption.

A ninth clause is provided in the form of a non-transitory computer readable medium embodying programmed instructions which, when executed by a processor, are operable for performing a method. The method includes storing values associated with individual features at a printing system and times indicating when the values were determined at the printing system, and operating an autoencoder to perform time-compression upon the values and the times. The method further includes validating the autoencoder, by: determining predictive powers of the individual features prior to time-compression via partial F tests; determining predictive powers of the individual features after time-compression via partial F tests; and determining differences between the predictive powers of the individual features before time-compression and the predictive powers of the individual features after time-compression. The method additionally includes generating a report for a user indicating invalidity of the autoencoder in an event that the differences in the predictive powers are not within a threshold; and generating a report for the user indicating validity of the autoencoder in an event that the differences in the predictive powers are within the threshold.

A tenth clause is provided in the form of the ninth clause wherein the instructions are further operable for: using the autoencoder to train a machine learning model, in the event that the differences in the predictive powers are within the threshold.

An eleventh clause is provided in the form of the ninth clause wherein each partial F test produces multiple sets of f-values and p-values, and the sets are compared to determine the differences in the predictive powers.

A twelfth clause is provided in the form of the ninth clause wherein performing a partial F test comprises: determining prediction accuracy for a machine learning model after training with a group of individual features; determining prediction accuracy for the machine learning model after training with a reduced group wherein a selected feature has been removed; and identifying a difference between the prediction accuracies as a predictive power of the selected feature that has been removed.

A thirteenth clause is provided in the form of the twelfth clause wherein the individual features comprise between ten and one hundred different features, and each group comprises between three and five different features.

A fourteenth clause is provided in the form of the ninth clause wherein determining predictive power of the individual features comprises iteratively performing partial F tests upon different, randomly selected, groups of the individual features.

A fifteenth clause is provided in the form of the ninth clause wherein operating the autoencoder to perform time-compression comprises estimating values associated with the features at a set of predetermined times, based on the values stored in memory.

A sixteenth clause is provided in the form of a method for validating an autoencoder for a printing system. The method includes storing values associated with individual features at a printing system and times indicating when the values were determined at the printing system, and operating an autoencoder to perform time-compression upon the values and the times. The method further includes validating the autoencoder, by: determining predictive powers of the individual features prior to time-compression via partial F tests; determining predictive powers of the individual features after time-compression via partial F tests; and determining differences between the predictive powers of the individual features before time-compression and the predictive powers of the individual features after time-compression. The method additionally includes generating a report for a user indicating invalidity of the autoencoder in an event that the differences in the predictive powers are not within a threshold; and generating a report for the user indicating validity of the autoencoder in an event that the differences in the predictive powers are within the threshold.

A seventeenth clause is provided in the form of the sixteenth clause, wherein the method further comprises: using the autoencoder to train a machine learning model, in the event that the differences in the predictive powers are within the threshold.

An eighteenth clause is provided in the form of the sixteenth clause, wherein each partial F test produces multiple sets of f-values and p-values, and the sets are compared to determine the differences in the predictive powers.

A nineteenth clause is provided in the form of the sixteenth clause, wherein performing a partial F test comprises: determining prediction accuracy for a machine learning model after training with a group of individual features; determining prediction accuracy for the machine learning model after training with a reduced group wherein a selected feature has been removed; and identifying a difference between the prediction accuracies as a predictive power of the selected feature that has been removed.

A twentieth clause is provided in the form of the nineteenth clause, wherein the individual features comprise between ten and one hundred different features, and each group comprises between three and five different features.

Figure 9:
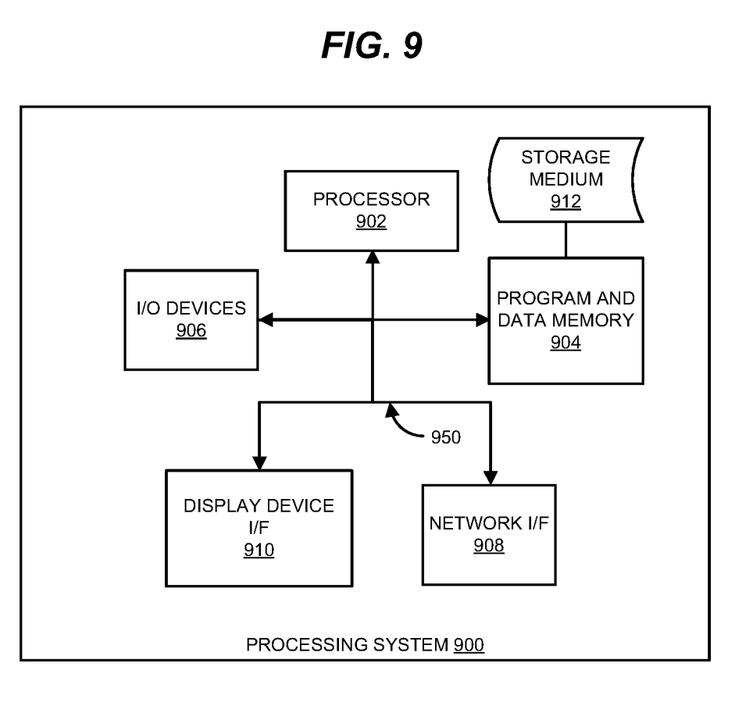
FIG. 9 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of machine learning environment 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system for validating an autoencoder for a printing system, the system comprising:
   a memory storing values associated with individual features at a printing system and further storing times indicating when the values were determined at the printing system; and
   a controller configured to operate an autoencoder to perform time-compression upon the values and the times,
   the controller further configured to validate the autoencoder by: determining predictive powers of the individual features prior to time-compression via partial F tests, determining predictive powers of the individual features after time-compression via partial F tests, and determining differences between the predictive powers of the individual features before time-compression and the predictive powers of the individual features after time-compression,
   the controller further configured to generate a report for a user indicating invalidity of the autoencoder, upon determining that the differences in the predictive powers are not within a threshold, and
   the controller further configured to generate a report for the user indicating validity of the autoencoder, upon determining that the differences in the predictive powers are within the threshold.

2. The system of claim 1 wherein:
   the controller is further configured to use the autoencoder to train a machine learning model, upon determining that the differences in the predictive powers are within the threshold.

3. The system of claim 1 wherein:
   each partial F test produces multiple sets of f-values and p-values, and the sets are compared to determine the differences in the predictive powers.

4. The system of claim 1 wherein:
   the controller is further configured to perform a partial F test by determining prediction accuracy for a machine learning model after training with a group of individual features, determining prediction accuracy for the machine learning model after training with a reduced group wherein a selected feature has been removed, and identifying a difference between the prediction accuracies as a predictive power of the selected feature that has been removed.

5. The system of claim 4 wherein:
   the individual features comprise between ten and one hundred different features, and each group comprises between three and five different features.

6. The system of claim 1, wherein:
   the controller is further configured to determine predictive power of the individual features by iteratively performing partial F tests upon different, randomly selected, groups of the individual features.

7. The system of claim 1, wherein:
   the autoencoder performs time-compression by estimating values associated with the features at a set of predetermined times, based on the values stored in the memory.

8. The system of claim 1 wherein:
   the features are selected from the group consisting of: fan speed for a printer, print medium temperature, fan temperature, print medium speed, print medium alignment, and ink consumption.

9. A non-transitory computer readable medium embodying programmed instructions which, when executed by a processor, are operable for:
   storing values associated with individual features at a printing system and times indicating when the values were determined at the printing system;
   operating an autoencoder to perform time-compression upon the values and the times;
   validating the autoencoder by:
     determining predictive powers of the individual features prior to time-compression via partial F tests;
     determining predictive powers of the individual features after time-compression via partial F tests; and
     determining differences between the predictive powers of the individual features before time-compression and the predictive powers of the individual features after time-compression;
   generating a report for a user indicating invalidity of the autoencoder, upon determining that the differences in the predictive powers are not within a threshold; and
   generating a report for the user indicating validity of the autoencoder, upon determining that the differences in the predictive powers are within the threshold.

10. The medium of claim 9, wherein the instructions are further operable for:
    using the autoencoder to train a machine learning model, upon determining that the differences in the predictive powers are within the threshold.

11. The medium of claim 9 wherein:
    each partial F test produces multiple sets of f-values and p-values, and the sets are compared to determine the differences in the predictive powers.

12. The medium of claim 9, wherein:
    performing a partial F test comprises:
      determining prediction accuracy for a machine learning model after training with a group of individual features;
      determining prediction accuracy for the machine learning model after training with a reduced group wherein a selected feature has been removed; and
      identifying a difference between the prediction accuracies as a predictive power of the selected feature that has been removed.

13. The medium of claim 12, wherein:
    the individual features comprise between ten and one hundred different features, and each group comprises between three and five different features.

14. The medium of claim 9, wherein:
    determining predictive power of the individual features comprises iteratively performing partial F tests upon different, randomly selected, groups of the individual features.

15. The medium of claim 9, wherein:
    operating the autoencoder to perform time-compression comprises estimating values associated with the features at a set of predetermined times, based on the values stored in memory.

16. A method for validating an autoencoder for a printing system, the method comprising:
- storing values associated with individual features at the printing system and times indicating when the values were determined at the printing system;
- operating the autoencoder to perform time-compression upon the values and the times;
- validating the autoencoder by:
  - determining predictive powers of the individual features prior to time-compression via partial F tests;
  - determining predictive powers of the individual features after time-compression via partial F tests; and
  - determining differences between the predictive powers of the individual features before time-compression and the predictive powers of the individual features after time-compression;
- generating a report for a user indicating invalidity of the autoencoder, upon determining that the differences in the predictive powers are not within a threshold; and
- generating a report for the user indicating validity of the autoencoder, upon determining that the differences in the predictive powers are within the threshold.

17. The method of claim 16 further comprising:
using the autoencoder to train a machine learning model, upon determining that the differences in the predictive powers are within the threshold.

18. The method of claim 16 wherein:
each partial F test produces multiple sets of f-values and p-values, and the sets are compared to determine the differences in the predictive powers.

19. The method of claim 16 wherein:
performing a partial F test comprises:
- determining prediction accuracy for a machine learning model after training with a group of individual features;
- determining prediction accuracy for the machine learning model after training with a reduced group wherein a selected feature has been removed; and
- identifying a difference between the prediction accuracies as a predictive power of the selected feature that has been removed.

20. The method of claim 19 wherein:
the individual features comprise between ten and one hundred different features, and each group comprises between three and five different features.

* * * * *